(12) United States Patent
Sato

(10) Patent No.: US 7,511,840 B2
(45) Date of Patent: Mar. 31, 2009

(54) IMAGE FORMING APPARATUS

(75) Inventor: Toshiyuki Sato, Mishima (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1055 days.

(21) Appl. No.: 10/354,039

(22) Filed: Jan. 30, 2003

(65) Prior Publication Data
US 2004/0150851 A1 Aug. 5, 2004

(51) Int. Cl.
G06F 15/00 (2006.01)
G06F 15/16 (2006.01)

(52) U.S. Cl. ...................... 358/1.15; 709/206

(58) Field of Classification Search ........... 358/1.15, 358/1.14, 402; 709/206, 220, 214, 224, 203, 709/223, 310; 719/310; 379/162, 102.01; 370/351, 352, 400; 84/609; 715/752, 838; 717/176, 171, 168, 174, 173
See application file for complete search history.

(56) References Cited

U.S. PATENT DOCUMENTS

2002/0143924 A1* 10/2002 Iga .......................... 709/223
2002/0144005 A1* 10/2002 Mae et al. ................. 709/310
2003/0086122 A1* 5/2003 Parry ....................... 358/402

FOREIGN PATENT DOCUMENTS

JP 2000-181718 A 6/2000

* cited by examiner

Primary Examiner—Saeid Ebrahim Dehkordy
(74) Attorney, Agent, or Firm—Foley & Lardner LLP

(57) ABSTRACT

The image forming apparatus includes a storage section that stores firmware and a connection section that serves to connect the apparatus to a network. The apparatus receives through the connection section, an e-mail enclosing an attachment of the firmware data, and having a header portion containing an exclusive command indicating that firmware data used for updating the version of the firmware is attached and data indicating a transmitter. Then, the apparatus, when judged that the header portion includes the exclusive command, updates the version of the firmware stored in the storage section with the firmware data. Further, the apparatus forms an e-mail indicating the updating of the firmware has been successfully carried out or resulted in failure and then send it back to the transmitter of the e-mail via the connection section.

20 Claims, 5 Drawing Sheets

```
Return-Path: OOOOOOO_OO@OOOOOOO.co.jp
Received: from e220r.OOOOOO.co.jp [157. 69. 121. 5])
    by fax7.mfp.OOOOOO.co.jp (ExpressMail 5. 10) with ESMTP
    id 20021015. 143224. 23400309 for <OOO@mfp.OOOOOO.co.jp>
    ; Tue, 15 Oct 2002 14:32:24 +0900
Received: (from root@localhost)
    by e220r.OOOOOO.co.jp (8. 12. 1/3. 7W-nomx) id g9F5MWvn027052
    for <OOO@mfp.OOOOOO.co.jp>; Tue, 15 Oct 2002 14:22:32 +0900 (JST)
Received: from unknown [157. 69. 122. 247] by e220r.OOOOOO.co.jp with SMTP id Q
AB27048: Tue, 15 Oct 2002 14:22:32 +0900
Received: by OOOOOO.co.jp (Lotus SMTP MTA v4.6.2 (693.3 8-11-1998)) id 4925
6C53.001E18C9: Tue, 15 Oct 2002 14:28:44 +0900
X- FWUPDATE 1
From: "OOOOOOO" (OOOOOO_OO@OOOOOO.co.jp>
To: OOOO_webmail@ybb.ne.jp
Message-ID: <49256C53. 001E1479. 01@OOOOOO.co.jp>
Date: Tue, 15 Oct 2002 14:25:31 +0900
Subject: =?iso-2022-jp?B?GyRCRy8ybCRPJCwkLSEhTT1Mczx1SVUkThsoQg==?=
    =?iso-2022- jp?B?GyRCJCpDTiRpJDshSiNUl1QjQiRoJGohSxsoQg==?=
Mime-Version: 1. 0
Content-type: text/plain : charset=iso-2022-jp
Content-Disposition: inline $BG/2l>u$N?=$79~$_$, $"$k$1$ll"$9$kl) (B                ......
```

F I G. 3

IMAGE FORMING APPARATUS

BACKGROUND OF THE INVENTION

1. Field of the Invention

The present invention relates to an image forming apparatus, and more specifically, to an image forming apparatus that stores firmware designed to realize various kinds of functions, and a method of updating the version of the firmware of the apparatus.

2. Description of the Related Art

Recently, many companies have built an environment that is connectable to the Internet. Further, in many cases, they have built local area networks within their companies. Image forming apparatus, for example, multi-function peripherals (MFP) are used under such network environment, and therefore the apparatus with not only a copying function but also a network connection function are becoming more popular.

The control portion of the MFP realizes various kinds of MFP by executing a program stored in firmware (F/W). The F/W is updated day by day at its sales agency or the like. Thus, when an F/W version is updated at the agency, it is necessary to update the F/W of the MFP that have been already sold to a customer. For updating, a service person visits the customer's place where the sold MFP are installed and carry out the following procedure. The procedure includes, for example, the process of replacing the ROM that stores the F/W, the process of connecting a personal computer (PC) to the MFP and downloading the update F/W data from the PC to the MFP, and the process of using exclusive software stored in a terminal device and thus updating the data via a network.

Here, it is very laborious for a service person to actually visit a place where the MFP are installed to update the version of F/W when there are a great number of MFP to be updated.

On the other hand, when the version of the F/W is updated via the Internet, which uses an e-mail, there is a possibility in security that the data of the F/W file is altered by a third person or is not accurately transmitted. With such altered or incomplete F/W data, the updating of the version will not be successfully carried out. Further, if the F/W file is dishonestly obtained, the updating of the version can be conducted illegally by anybody.

Under the circumstances, there are needs for an image forming apparatus capable of updating the version of the firmware without requiring a service person to visit a site where the apparatus is installed, securing its reliability and preventing the illegal updating of the version.

BRIEF SUMMARY OF THE INVENTION

According to an embodiment of the present invention, the image forming apparatus of the present invention comprises a storage section that stores firmware and a connection section that serves to connect the apparatus to a network. The apparatus receives by its receiving section through the connection section, an e-mail enclosing an attachment of the firmware data, and having a header portion containing an exclusive command indicating that firmware data used for updating the version of the firmware is attached and data indicating a transmitter. The apparatus judges in its judgment section whether or not the header portion of the e-mail includes the exclusive command. When the judgment section judges that the header portion includes the exclusive command, the apparatus updates the version of the firmware with the firmware data attached to the e-mail in the updating section. Further, the apparatus forms an e-mail indicating the updating of the firmware has been successfully carried out or resulted in failure at the transmitting section and then send it back to the transmitter of the e-mail via the connection section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of embodiments given below, serve to explain the principles of the invention.

FIG. 3 is a diagram showing an example of a header portion including an exclusive command;

DETAILED DESCRIPTION OF THE INVENTION

Embodiments of the present invention will now be described in detail with reference to accompanying drawings. Note that the descriptions will be made in connection with the case where the present invention is applied to multi-function peripherals (MFP) that have a scanner function, printing function, copying function, facsimile function and network connection function or the like.

First Embodiment

Figure 1:
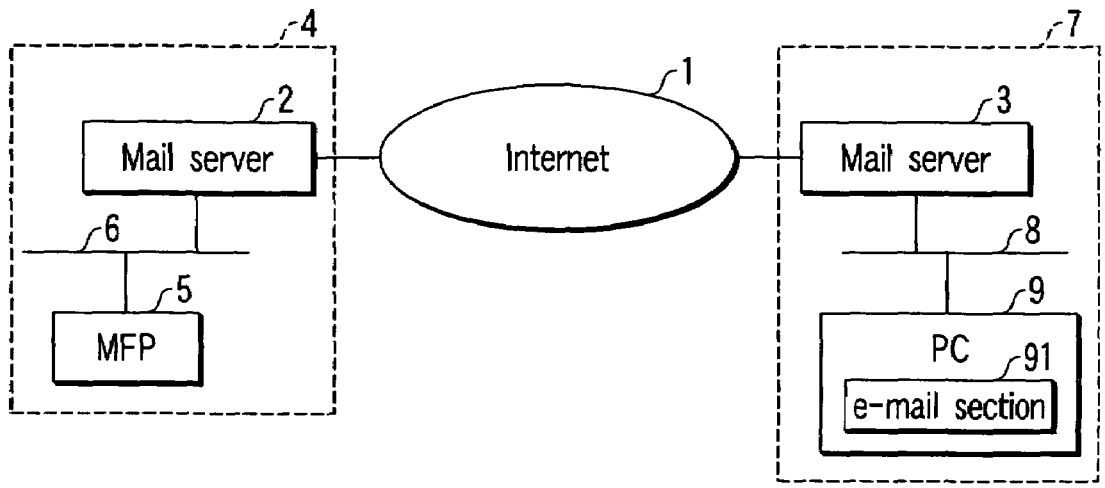
FIG. 1 is a diagram showing a network structure in the first embodiment of the present invention.

FIG. 1 discloses an example of an entire structure of a network, in which a mail server 2 and a mail server 3 are connected to each other via the Internet 1.

The mail server 2 is installed in, for example, an office 4. MFP 5 are connected to the mail server 2 via a local area network (LAN) 6.

Figure 2:
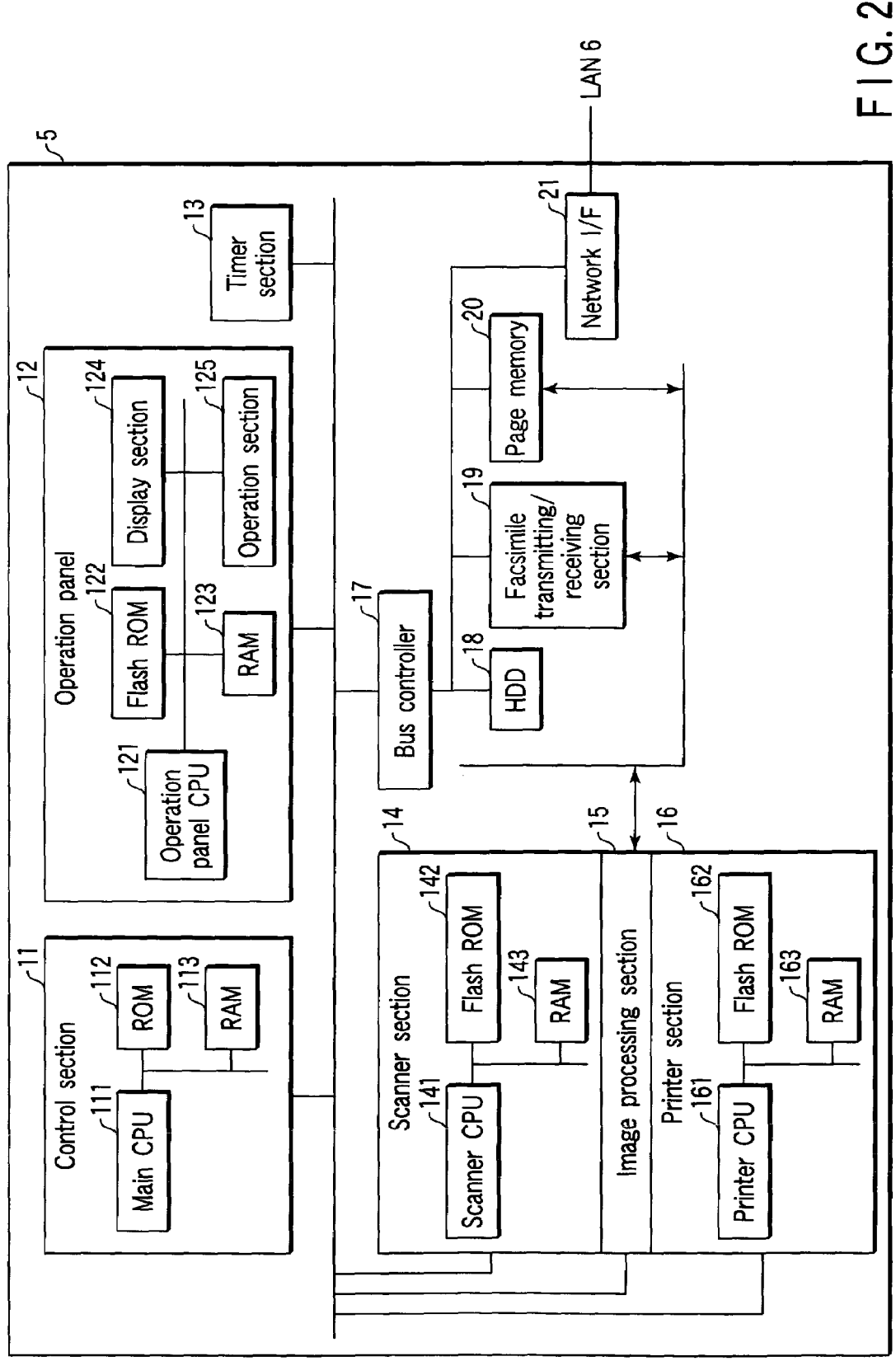
FIG. 2 is a diagram showing a control structure of the MFP in the first embodiment.

A brief structure of the control block of the MFP 5 will now be described with reference to FIG. 2. The structure of the MFP 5 includes a control section 11, an operation panel 12, a timer section 13, a scanner section 14, an image processing section 15, a printer section 16, a bus controller 17, a hard disk drive (HDD) 18, a facsimile transmitting/receiving section 19, a page memory 20 and a network interface (I/F) 21 (connection section) and the like.

The control section 11, the operation panel 12, the timer section 13, the scanner section 14, the image processing section 15, the printer section 16 and the bus controller 17 are connected via a bus line. The bus controller 17, the HDD 18, the facsimile transmitting/receiving section 19, the page memory 20 and the network I/F 21 are connected via a bus line. Further, the image processing section 15, the facsimile transmitting/receiving section 19 and the page memory 20 are connected via a bus line.

The control section includes a main CPU 111, a ROM 112, a RAM 113 and the like. The ROM 112 stores a program that controls the sections overall, an exclusive program used for analyzing e-mails and forming e-mails, and the like. In the RAM 113, a work area or the like that becomes necessary for the main CPU 111 to carry out various types of processing is formed. The main CPU 111 executes the program stored in the ROM 112 and thus control each of the sections overall.

The operation panel 12 includes a control panel CPU 121, a flash ROM 122, a RAM 123, a display section 124, an operation section 125 and the like. The flash ROM 122 stores a program used for controlling the display section 124 and the operation section 125 in the form of firmware (F/W). The control panel CPU 121 executes the program stored in the flash ROM 122 and thus controls various types of instructions to be input from the operation section 125 and various types of data to be displayed on the display section 124.

The timer section 13 carries out the operation of timing. Further, it times a predetermined period of time on the basis of the instruction from the control section 11.

The scanner section 14 is controlled by a scanner CPU 141, a flash ROM 142, and a RAM 143. The flash ROM 142 stores a program used for controlling the image reading operation of the scanner section 14 in the form of firmware (F/W). The scanner CPU 141 executes the program stored in the flash ROM 142 and thus reads, for example, the image of an original document sent from an auto-document feeder (ADF), which is not shown in the figure, and, for example, sends it to the image processing section 15.

The image processing section 15 carries out a predetermined image processing on the image data sent from the scanner section 14. The image data thus processed is output to the facsimile transmitting/receiving section 19 or the page memory 20.

The printer section 16 is controlled by a printer CPU 161, a flash ROM 162 and a RAM 163. The flash ROM 162 stores a program used for controlling the printing operation of the printer section 16 in the form of F/W. The printer CPU 161 executes the program stored in the flash ROM 162 and thus operates each section for forming images, for example, to form an image on the basis of the image data stored in the page 20, onto a paper sheet that is fed through a paper feeding path, which is not shown in the figure.

The bus controller 17 is controlled by the control section 11 and it controls the destination of each of various types data. The page memory 20 is used to rotate, compress or expand the image data to be printed, or it is used to convert the solution of the image data, or the like. The facsimile transmitting/receiving section 19 receives or transmits an Internet facsimile via the network I/F 21.

The HDD 18 stores, for example, images read by the scanner section 14, e-mails received via the network I/F and the like. It further stores various types of application software items used for operating the above-described sections.

The network I/F 21 is connected to the LAN 6 in a communicatable manner. With this structure, the MFP can communicate with a computer device that is connected to the Internet. Thus, it becomes possible for the MFP 5 to receive or transmit e-mails via the network I/F 21.

The mail server 3 is provided in, for example, a sales agency 7 that provides maintenance services for the MFP 5 in a predetermined local area. To the mail server 3, a PC (personal computer, which supplies the firmware data) 9 is connected via the LAN 8.

The PC 9 is provided with an e-mail section 91 that can form e-mails and analyze e-mails. In general, an e-mail has a header portion in which data such as addresses of its transmitter and its destination and transmission date are written. The header portion contains, other than those mentioned above, item "X-" which can set the command function for each type of mailing software items. The command written in the body portion of the item "X-" in the header portion of an e-mail formed by the e-mail section 91 is provided to correspond to the exclusive program of the MFP 5, which is used for analyzing e-mails.

The term "correspond" used here is meant that when the MFP 5 receive an e-mail, the control section 11 is able to recognize the exclusive command written in the body portion of the item "X-" of the e-mail formed by the e-mail section 91, and execute the contents of the command by the exclusive program. The command written in the body portion of the item "X-" is an exclusive command that indicates the attachment of F/W data which is used to update the version of the current F/W. This exclusive command is written, for example, as "X-FWUPDATE1". In this embodiment, the versions of the F/W of all of the flash ROMs 122, 142 and 162 are updated with the above-described exclusive command.

It should be noted that the body portion may contain, for example, data indicating which F/W or which version of which flash ROM is to be updated or file name of a firmware item to be updated. With this structure, even if there are a number of F/W items present, it is possible to update a certain F/W version that is desired.

Figure 4:
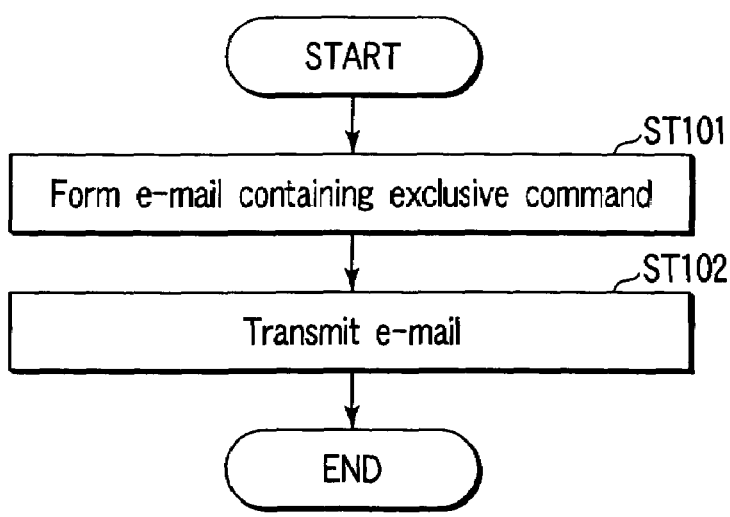
FIG. 4 is a flowchart illustrating a process of transmitting an e-mail to the MFP.

As can be seen in FIG. 4, the PC 9 receives, in step ST101, inputs of the data indicating the destination, the data of the F/W for updating the current version, and the like, which are made by a service person using a keyboard, which is not shown in the figure, and forms an e-mail by the e-mail section 91. Then, in step ST102, the e-mail is transmitted from the PC 9 to the MFP 5 when the service person instructs so.

An example of the description in the header portion of the e-mail that is received by the MFP 5 is shown in FIG. 3. As shown, in a central section of the description of the header portion, an exclusive command, "X-FWUPDATE1" is written.

Figure 5:
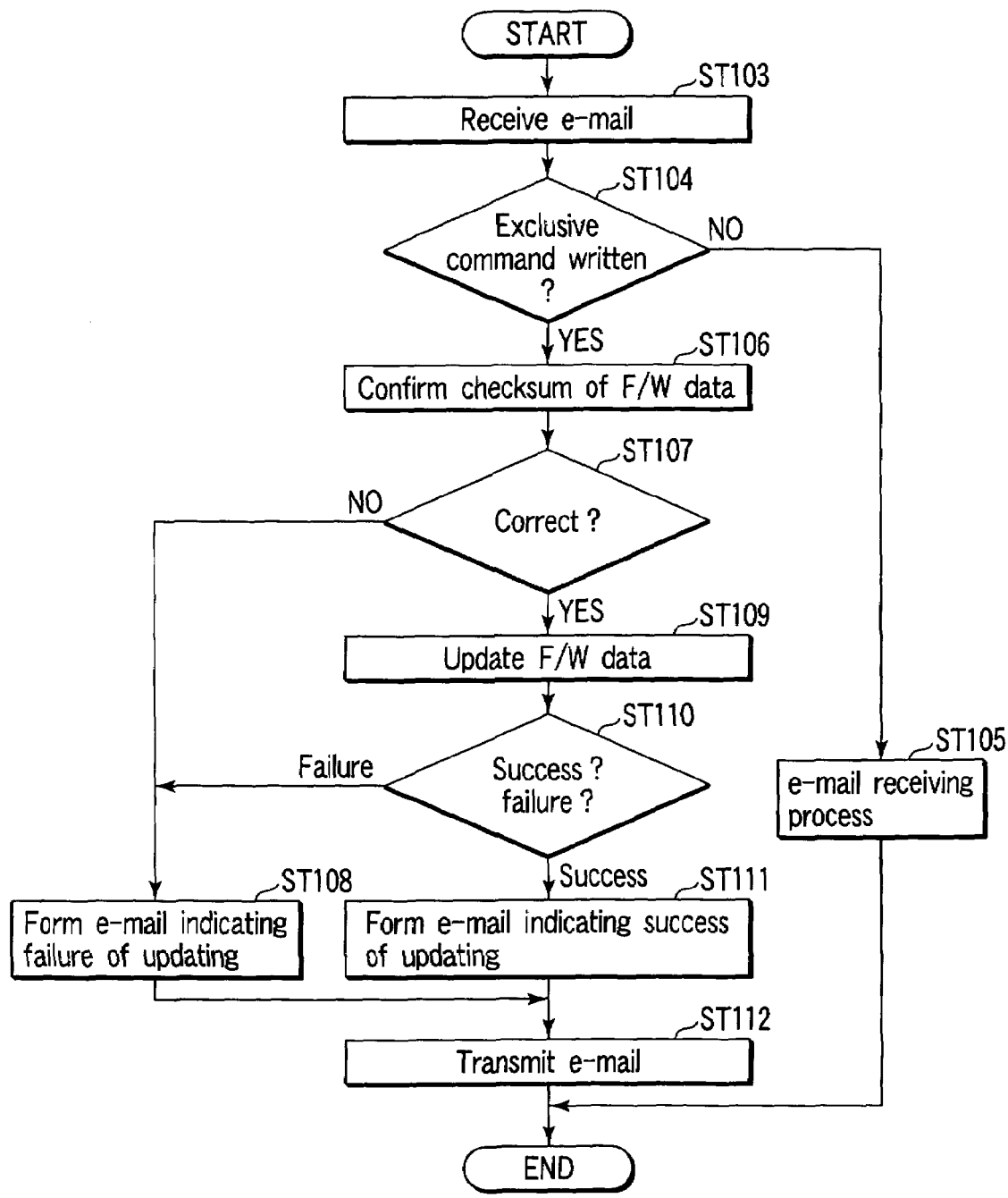
FIG. 5 is a flowchart illustrating a process when an e-mail is received.

Next, a process executed when the MFP 5 receive from the PC 9 an e-mail that contains the above-described exclusive command written therein and the F/W data attached thereto, will now be described with reference to the flowchart provided in FIG. 5.

In step ST103, an e-mail is received via the network I/F 21 (by the receiving section). The e-mail is stored in, for example, the HDD 18. In step ST104, the main CPU 111 reads an exclusive program used to analyze the e-mail from the ROM 112 and analyses the header portion of the e-mail. In this analysis, it is judged whether or not the command that is written after the item "X-" is an exclusive type (by the judgment section). If it is judged that an exclusive command is not written, or commands other than the exclusive type are written, the process proceeds to step ST105. If it is judged that an exclusive command is written, the process proceeds to step ST106.

In step ST105, a regular e-mail receiving process is carried out, which is, for example, reporting to a PC (not shown) of the maintenance person of the MFP 5 connected to the LAN, that an e-mail has been received.

In step ST106, the checksum of the F/W data attached to the e-mail is confirmed. Then, in step ST 107, the checksum of the F/W data is checked and if it is judged that the data is wrong, the process proceeds to step ST108. Or it is judged from the checking that the data is right, the process proceeds to step ST109.

In step ST108, an e-mail indicating the failure in updating the F/W data is formed. Here, it is possible to add such information that the updating could not be carried out because it was judged that the checksum of the F/W data is not right, which resulted in the failure of the updating, to the e-mail.

In step ST109, the F/W items stored in the flash ROMs 122, 142 and 162 are updated in order (by the updating section).

Subsequently, in step ST110, it is judged if the updating of the F/W data of the flash ROM 122, 142 and 162 have been successfully carried out or resulted in failure. In the case of failure, the process proceeds to the before-described step ST106, whereas in the case of success, it proceeds to the step ST111.

It should be noted that when the process proceeds to step ST108 in the failure case, it is also possible to add information indicating the factor of the updating resulting in failure to the e-mail. For example, it is considered that some users of the MFP 5 may not wish to update the version of the current F/W at all, or not wish it at least for a certain period of time because the user cannot use the MFP 5 during the period of the updating operation. Thus, in some cases, the user has operated the operation section 125 to set the inhibition of the updating of the current F/W version. When such a structure is set, the updating of the current F/W version cannot be carried out. Thus, it is possible to add the factor of the updating of the F/W data resulting in failure, including the case where the F/W data has not been transmitted accurately (that is the case of "NO" in step ST 107), to an e-mail. In this manner, it is possible to grasp the status regarding the updating of the F/W version of each of the users who use the MFP 5 in charge with maintenance services.

In step ST111, an e-mail indicating that the F/W data has been successfully updated is formed.

When an e-mail is formed in step ST108 or step ST111, the address of the transmitter is read from the header portion of the e-mail that has been received via the network and the formed e-mail is transmitted to the read address in step ST112 (by the transmitting section).

Next, the operation of the method for updating the firmware of the MFP 5 connected to the PC 9 to be communicatable via each network, will now be described.

The maker or sales agency of the MFP 5 is improving day by day the F/W in order to enhance various operations of the MFP 5 and the usability thereof for users. When a version of the F/W is updated, the updated F/W data is distributed to the sale agencies or the like.

A service person of a sale agency, when obtaining the updated version of the F/W, transmits an e-mails with attachment of the updated F/W data, to the MFP 5 of the users through the operation of the PC 9. The item "X-" of the header portion of each e-mail contains an exclusive command written therein, indicating that the F/W data used to update the current version of the F/W is attached.

When the e-mail is received from the PC 9, the MFP 5 recognizes, from the description in the item "X-" in its header portion, that it is a mail for updating the version of the F/W. Then, if the attached F/W data has been accurately transmitted, the current version of the F/W is updated, and if not, the F/W is not updated.

When the updating of the version of the current F/W has been successfully carried out, the MFP 5 transmit an e-mail indicating the success of the updating to the PC 9, whereas when the F/W data has not been transmitted accurately or the updating of the current F/W has resulted in failure, the MFP 5 transmit an e-mail indicating the failure of the updating to the PC 9.

Thus, with use of e-mails that are from the PC 9 installed in sales agency or the like via the Internet, the current version of the F/W of the MFP 5 can be updated automatically and easily without a service person actually visiting each site where the MFP are installed.

The e-mail that is transmitted to update a version of F/W must be formed with use of an application software item that can form an exclusive command in the item "X-" of its header portion. In other words, if an e-mail is transmitted with attachment of F/W data and with a pretense title and contents from an ordinary mailing software application, the updating of the version of the F/W is not carried out. With this security measures, the updating of the F/W can be carried out only by a service person, a dealer and a staff of the maker, who owns the exclusive software item. In this manner, if the updating of the F/W data of the MFP 5 is carried out through the Internet, it is possible to maintain its reliability in security and thus possible to inhibit the unlawful use of the F/W data that used to update the current version of the F/W.

Further, the service person or the like, who transmitted an e-mail with attachment of the F/W data to the MFP 5 can receive a return e-mail indicating that the updating of the version of the F/W has been successfully carried out or resulted in failure. By this way, in case where the updating of the current F/W of the MFP 5 has resulted in failure, the service person can easily take measures for the situation after that.

It should be noted that if an e-mail has been achieved and it is judged that the F/W data is appropriate in step ST 105, it is possible in some cases that the version of the F/W to be updated cannot be updated immediately since, for example, the F/W is being executed. In such cases, the control section 11 calculates the time to finish the process being executed, and times it with timer section 13. Then, it fetches the F/W data attached to the e-mail stored in the HDD 18, and updates the version when the execution of the process is finished. Here, after it is judged in step ST104 that the exclusive command is written, when the MFP 5 assign such setting that no new command will be accepted, the updating of the current F/W is carried out immediately after the completion of the process being executed.

Second Embodiment

Next, the second embodiment will now be described. Note that similar structural elements to those of the above-described embodiment will be denoted by the same reference symbols and their detailed explanation will be omitted.

Figure 6:
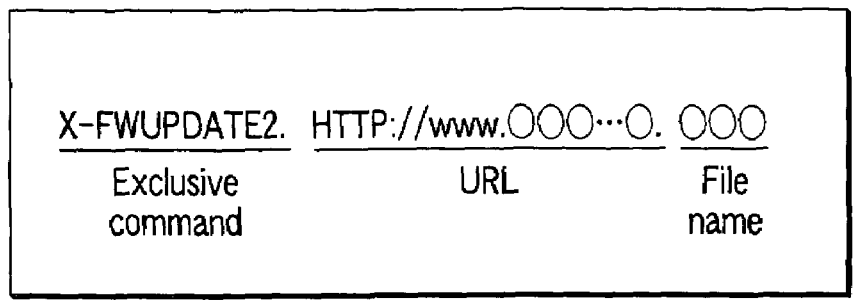
FIG. 6 is a diagram showing an exclusive command of the second embodiment.

The structural parts that are different from those of the above-described embodiment will be focused. An e-mail handled in this embodiment and formed by a service person with use of the PC 9 (computer device) includes a header portion that has an item "X-", in a body portion of which, an exclusive command indicating that the updating of the F/W can be carried out, data indicating the address on the network to which the F/W data used for updating the version of the F/W is distributed (firmware data source), that is, for example, the universal resource locator (URL) and the file name of the F/W data used for updating the version, are written. An example of the description in the item "X-" is shown in FIG. 6. As shown, after the exclusive command "FWUPDATE2", URL "HTTP://WWW.○○ . . . ○" and the file name are written. It should be noted here that the file name may not be written in the item "X-" but it may be written in the item, subject portion. With this structure, it is possible to specify the file name by extracting from the subject portion.

Further, the MFP 5 are provided with a program used to execute the hyper text transfer protocol (HTTP) client function in its ROM 112. Further, a program used to execute a security function such as secure socket layer (SSL) is provided. With these programs, the MFP 5 are able to safely access a desired URL.

It should be pointed out that it is also possible to access a desired URL by means of the file transfer protocol (FTP) in place of the HTTP client function.

Figure 7:
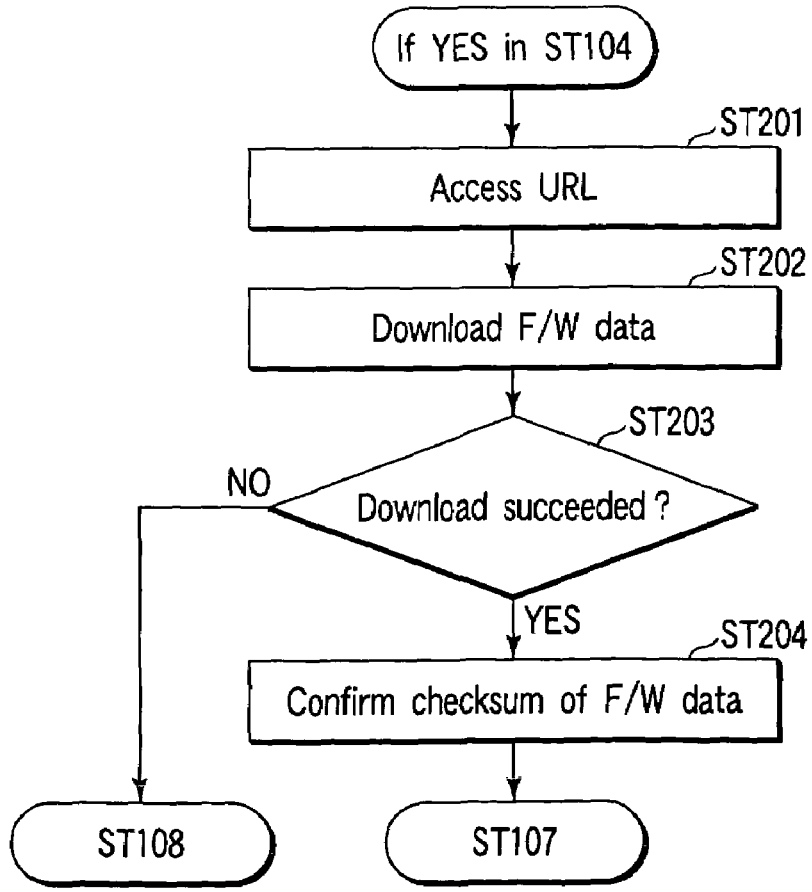
FIG. 7 is a flowchart illustrating another process when an e-mail is received in the second embodiment.

Next, the flow of the process executed by the main CPU 111 when the MFP 5 receive the e-mail from the PC 9 will now be described. In this process, the steps ST201 to ST204 shown in FIG. 7 are carried out in place of the step ST106 explained with reference to the flowchart shown in FIG. 4.

That is, when it is judged to be "YES" in the above-described step ST104, the process proceeds to step ST201. In step ST201, the MFP 5 access the URL that can be obtained from the description in the body portion of the item "X-" of the header portion of the e-mail.

In step ST202, the F/W data under the file name obtained from the description in the body portion of the item "X-" is downloaded. In step ST203, it is judged if the downloading of the F/W data has been successfully carried out or resulted in failure. When it is judged that the downloading has resulted in failure, the process of the above-described step ST106 is carried out. When judged that the downloading has been successfully carried out, the process proceeds to step ST204.

In step ST204, the checksum of the F/W data that has been downloaded is checked. Then, the process goes on to the above-described ST105, where it is judged whether or not the checksum of the F/W data that has been downloaded is correct. The process from this step on is similar to that described in the first embodiment described above.

Next, the operation of the method of updating a version of the F/W of the MFP 5 connected to be communicatable to the PC 9 via the networks as described above, will now be explained.

In order to update the version of the F/W of the MFP 5 subjected to the maintenance service, a service person from a sales agency operates the PC 9 to form an e-mail by inputting the exclusive command indicating that the version of the F/W is updated, the URL and file name in which the F/W data is made public. The, the service person sends the e-mail to the MFP 5. It should be noted that the item "X-" of the header portion of the e-mail contains the exclusive command, URL and file name that have been input.

Next, when receiving the e-mail from the PC 9, the MFP 5 recognize, from the description contained in the body portion of the item "X-" of the header portion, that it is a mail indicating that the version of the F/W can be updated. Then, the MFP 5 obtains the URL and file name from the description of the body portion in the header and access them, thus downloading the F/W data used to update the current version of the F/W. When the downloading of the data has been successfully carried out, the MFP 5 update the current F/W, whereas when it has resulted in failure, the F/W is not updated.

After that, the MFP 5 form an e-mail indicating the success of the updating of the F/W when succeeded or one indicating the failure of the updating when failed, and send the mail to the PC 9.

With this embodiment, the same advantage as that of the before-described embodiment can be obtained.

It should be noted that in each of the embodiments, the F/W is stored in the flash ROM 122, 142 and 162. However, the invention is not limited to this, but the F/W may be stored not only in a flash ROM, but also in any type of non-volatile recording medium. In other words, the present invention may be formed to have a structure in which an application software item stored in, for example, the HDD 18 can be regarded as F/W and therefore updated.

Further, the updating of the F/W is conducted via the Internet 1; however the present invention is not limited to such a structure, but it can be applied to a system between a PC connected to a LAN and MFP.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus, comprising:
    a memory section configured to store firmware;
    a connection section configured to connect the apparatus to a network;
    a receiving section configured to receive an e-mail including a header portion containing an exclusive command indicating that firmware data used for updating the version of the firmware is attached and data indicating a transmitter, and enclosing an attachment of the firmware data, via the connection section;
    a checking section configured to confirm a checksum of the firmware data;
    a judgment section configured to judge whether the header portion of the e-mail contains the exclusive command, when the checksum of the firmware data is correct;
    an updating section configured to update a version of the firmware with the firmware data attached to the e-mail when the judgment section judges that the header portion includes the exclusive command when the firmware is being executed, the updating section updating the version of the firmware after a timer counts a time to finish the execution calculated by a control section; and
    a transmitting section configured to form an e-mail indicating the updating of the firmware has been successfully carried out or resulted in failure and then send it back to the transmitter of the e-mail via the connection section.

2. An image forming apparatus according to claim 1, wherein the receiving section, when the receiving section receive the e-mail including the header portion containing the exclusive command, will not accept a new command.

3. An image forming apparatus according to claim 1, further comprising:
    a display section;
    an operation section
    a scanning section; and
    a printing section,
    wherein the firmware includes firmwares to be used for the display section, the operation section, the scanning section, and the printing section.

4. An image forming apparatus according to claim 1, wherein the header portion of the e-mail includes information regarding a version of which firmware is to be updated, and wherein the updating section updates according to the information.

5. An image forming apparatus according to claim 1, wherein the network is the Internet.

6. An image forming apparatus, comprising:
    a memory section configured to store firmware;
    a connection section configured to connect the apparatus to a network;
    a receiving section configured to receive an e-mail including a header portion containing an exclusive command indicating that firmware data used for updating the version of the firmware is attached, data indicating an address on the network, which distributes firmware item used to update a current version of the firmware, and data indicating a transmitter, via the connection section;

a checking section configured to confirm a checksum of the firmware data;

a judgment section configured to judge whether the header portion of the e-mail contains the exclusive command, when the checksum of the firmware data is correct;

an updating section configured to access the address and downloads the firmware data, and then update the current version of the firmware stored in the storage section with the firmware data when the judgment section judges that the header portion includes the exclusive command when the firmware is being executed, the updating section updating the version of the firmware after a timer counts a time to finish the execution calculated by a control section; and a transmitting section configured to form an e-mail indicating the updating of the firmware has been successfully carried out or resulted in failure and then send it back to the transmitter of the e-mail via the connection section.

7. An image forming apparatus according to claim 6, wherein the receiving section, when the receiving section receive the e-mail including the header portion containing the exclusive command, will not accept a new command.

8. An image forming apparatus according to claim 6, further comprising:

a display section;

an operation section;

a scanning section; and a printing section, and wherein the firmware includes firmwares to be used for the display section, the operation section, the scanning section and the printing section.

9. An image forming apparatus according to claim 6, wherein the header portion of the e-mail includes information regarding a version of which firmware is to be updated, and wherein the updating section updates according to the information.

10. An image forming apparatus according to claim 6, wherein the network is the Internet.

11. A method of updating firmware of an image forming apparatus communicatably connected to a firmware data source via a network, comprising:

receiving an e-mail including a header portion containing an exclusive command indicating that firmware data used for updating the version of the firmware is attached and data indicating a transmitter, and enclosing an attachment of the firmware data, from the firmware data source;

checking a checksum of the firmware data;

judging whether the header portion of the received e-mail contains the exclusive command, when the checksum of the firmware data is correct;

updating a version of the firmware with the firmware data when judged that the header portion includes the exclusive command and, when the firmware is being executed, updating the version of the firmware after counting a time to finish the execution calculated; and forming an e-mail indicating the updating of the firmware has been successfully carried out or resulted in failure and then sending it back to the firmware data source.

12. A method of updating firmware according to claim 11, wherein when receiving the e-mail including the header portion containing the exclusive command, not accepting a new command.

13. A method of updating firmware according to claim 11, wherein the image forming apparatus further comprising a display section, an operation section, a scanning section, and a printing section; and wherein the firmware includes firmwares to be used for the display section, the operation section, the scanning section and the printing section.

14. A method of updating firmware according to claim 11, wherein the header portion of the e-mail includes information regarding a version of which firmware is to be updated, and wherein the updating including updating the version according to the information.

15. A method of updating firmware according to claim 11, wherein the network is the Internet.

16. A method of updating firmware according to claim 15, wherein when receiving the e-mail including the header portion containing the exclusive command, not accepting a new command.

17. A method of updating firmware according to claim 15, wherein the image forming apparatus further comprising a display section, an operation section, a scanning section, and a printing section; and wherein the firmware includes firmwares to be used for the display section, the operation section, the scanning section, and the printing section.

18. A method of updating firmware according to claim 15, wherein the header portion of the e-mail includes information regarding a version of which firmware is to be updated, and wherein the updating include updating the version according to the information.

19. A method of updating firmware according to claim 15, wherein the network is the Internet.

20. A method of updating firmware of an image forming apparatus communicatably connected to a firmware data source via a network, comprising:

receiving an e-mail including a header portion containing an exclusive command indicating that firmware data used for updating the version of the firmware is attached, data indicating an address on the network, which distributes firmware item used to update a current version of the firmware, and data indicating a transmitter, from a computer apparatus connected to the network;

checking a checksum of the firmware data;

judging whether the header portion of the received e-mail contains the exclusive command, when the checksum of the firmware data is correct;

downloading the firmware data from the firmware data source, and updating the current version of the firmware with the firmware data when judged that the header portion includes the exclusive command and, when the firmware is being executed, updating the version of the firmware after counting a time to finish the execution calculated; and forming an e-mail indicating the updating of the firmware has been successfully carried out or resulted in failure and then sending it back to the firmware data source.

* * * * *